United States Patent
Switzer et al.

(10) Patent No.: US 12,404,000 B2
(45) Date of Patent: Sep. 2, 2025

(54) RAISED DECORATIVE LAMINATE PANEL AND METHOD

(71) Applicant: The Boeing Company, Arlington, VA (US)

(72) Inventors: Lon Eric Switzer, Seattle, WA (US); Gregory William Nelson, Everett, WA (US); Frank H. Fash, Lynnwood, WA (US); Carolina Aranda, Snohomish, WA (US); Eric Eagon, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/472,598

(22) Filed: Sep. 22, 2023

(65) Prior Publication Data
US 2025/0100668 A1 Mar. 27, 2025

(51) Int. Cl.
*B64C 1/06* (2006.01)
(52) U.S. Cl.
CPC .................. *B64C 1/066* (2013.01)

(58) Field of Classification Search
CPC ....... B64C 1/066; E06B 3/7015; G09F 21/08; B32B 27/00
See application file for complete search history.

(56) References Cited

U.S. PATENT DOCUMENTS

| | | | | |
|---|---|---|---|---|
| 10,611,454 B2 * | 4/2020 | LeBlanc | ................. | B32B 37/02 |
| 10,967,605 B2 * | 4/2021 | Wang | ....................... | B32B 27/08 |
| 12,043,171 B1 * | 7/2024 | Switzer | ................. | B32B 27/365 |
| 2006/0277807 A1 * | 12/2006 | Wilde | .................... | G09F 21/049 |
| | | | | 428/204 |
| 2016/0250828 A1 * | 9/2016 | Wilde | ....................... | B32B 7/12 |
| | | | | 428/196 |
| 2018/0251205 A1 * | 9/2018 | LeBlanc | ................. | B32B 37/12 |

* cited by examiner

*Primary Examiner* — Joshua J Michener
*Assistant Examiner* — Cindi M Curry
(74) *Attorney, Agent, or Firm* — COATS & BENNETT, PLLC

(57) ABSTRACT

Wall panel constructions are disclosed having visually detectable dimensional characteristic imparted to a panel exterior surface as a raised relief area by providing a cabin wall panel assembly with a panel insert having a dimensional characteristic interposed between a panel substrate and a deformable outer panel layer that is deformed under pressure to form the visually detectable raised relief area comprising the dimensional characteristic in the cabin panel exterior surface.

14 Claims, 9 Drawing Sheets

RAISED DECORATIVE LAMINATE PANEL AND METHOD

TECHNOLOGICAL FIELD

The present disclosure relates generally to the field of panels for interior environments. More specifically, the present disclosure relates to the field of decorative laminate cabin panels for interior environments in vehicle cabins.

BACKGROUND

Decorative panels for use in vehicle cabins, including aircraft passenger cabins, typically comprise a panel construction that includes a structural panel that can be a laminate panel construction, and that has a structural panel component and panel covering for a panel outer surface. The panel covering can comprise a material that can maintain a neat overall appearance over many years, and that can be cleaned easily during regular aircraft cabin cleanings.

The aircraft cabin panels typically used in aircraft cabin manufacture must meet regulatory guidelines in terms of flammability, etc., and material selection for cabin use has been limited, practically, to the use of panel materials that have been regulatorily approved as acceptable materials. While decorative customer choices have involved color and perhaps texture selection that can vary from plane to plane and cabin to cabin to achieve an aesthetic customer goal, many aircraft cabins have presented a reasonably uniform cabin panel appearance as the cabin panels used and the cabin panel outer layer appearance is relatively uniform across the industry.

Unless explicitly identified as such, no statement herein is admitted as prior art merely by its inclusion in the Technological Field and/or Background section.

SUMMARY

Present aspects are directed to an aircraft cabin panel that can be an aircraft cabin panel of an aircraft, and that includes a panel substrate, with the panel substrate including a panel substrate first side, and a panel substrate second side. The present aircraft cabin panel further includes a panel insert, with the panel insert comprising a panel insert first side and a panel insert second side, with the panel insert second side positioned adjacent the panel substrate first side, and with the panel insert further comprising a panel insert dimensional characteristic. The present aircraft cabin panel further includes a deformable outer panel layer, with the deformable outer panel layer including a deformable outer panel layer first side ("outer" surface facing the cabin interior) and a deformable outer panel layer second side ("inner" side facing the insert), with the deformable outer panel layer further including a deformable outer panel layer average thickness, with the deformable outer panel layer first side further including a raised area, and with the raised area substantially matching the panel insert dimensional characteristic.

In another aspect, the deformable outer panel layer dimensional characteristic is visually detectable.

In another aspect, the deformable outer panel layer second side is an aircraft cabin panel exterior surface.

In another aspect, the aircraft cabin panel exterior surface includes an aircraft cabin panel exterior surface raised area, with the raised area being out-of-plane with respect to the aircraft cabin panel exterior surface.

In another aspect, the raised area is detectable to at least one of the human eye and human touch.

In another aspect, the panel substrate includes a sandwich panel construction.

In a further aspect, the sandwich panel construction of the panel substrate includes a honeycomb structural material.

In another aspect, the deformable outer panel layer includes a film layer.

In another aspect, the deformable outer panel layer includes a single film layer.

In a further aspect, the deformable outer panel layer comprises a decorative laminate coating layer.

In another aspect, the present aircraft cabin panel further includes a panel insert positioning element, with the panel insert positioning element configured to maintain the panel insert in a selected position between the panel substrate first side and the deformable outer panel layer second side during assembly of the aircraft cabin panel.

In another aspect, the panel insert positioning element includes a selected amount of at least one of an adhesive and a tackifier.

In another aspect, the panel insert positioning element includes is a physical element configured to facilitate the mating of the panel insert with at least one of the panel substrate first side and the deformable outer panel layer second side in an aircraft cabin panel pre-assembly.

In a further aspect, the present aircraft cabin panel further includes an adhesive layer, with the adhesive layer positioned between the panel substrate first side and the panel insert second side.

In another aspect, the panel insert further comprises an adhesive layer on at least one of the panel insert first side and the insert second side.

A present aspect is directed to an aircraft cabin comprising an aircraft cabin panel that includes a panel substrate, with the panel substrate including a panel substrate first side, and a panel substrate second side. The present aircraft cabin panel further includes a panel insert, with the panel insert comprising a panel insert first side and a panel insert second side, with the panel insert second side positioned adjacent the panel substrate first side, and with the panel insert further comprising a panel insert dimensional characteristic. The present aircraft cabin panel further includes a deformable outer panel layer, with the deformable outer panel layer including a deformable outer panel layer first side ("outer" surface facing the cabin interior) and a deformable outer panel layer second side ("inner" side facing the panel insert), with the deformable outer panel layer further including a deformable outer panel layer average thickness, with the deformable outer panel layer first side further including a raised area, and with the raised area substantially matching the panel insert dimensional characteristic.

Another present aspect is directed to an aircraft including an aircraft cabin panel that includes a panel substrate, with the panel substrate including a panel substrate first side, and a panel substrate second side. The present aircraft cabin panel further includes a panel insert, with the panel insert comprising a panel insert first side and a panel insert second side, with the panel insert second side positioned adjacent the panel substrate first side, and with the panel insert further comprising a panel insert dimensional characteristic. The present aircraft cabin panel further includes a deformable outer panel layer, with the deformable outer panel layer including a deformable outer panel layer first side ("outer" surface facing the cabin interior) and a deformable outer panel layer second side ("inner" side facing the panel insert), with the deformable outer panel layer further including a deformable outer panel layer average thickness, with the deformable outer panel layer first side further including a raised area, and with the raised area substantially matching the panel insert dimensional characteristic.

A further present aspect is directed to a method for forming a raised relief area on an aircraft cabin panel assembly exterior surface, with the method including disposing a panel insert between a panel substrate exterior side and a deformable outer panel layer interior side to form an aircraft cabin panel pre-assembly, with the aircraft cabin panel pre-assembly comprising an aircraft panel pre-assembly exterior surface, with the panel insert comprising a panel insert dimensional characteristic, and with the panel insert further comprising a panel insert first side and a panel insert second side. The method further includes applying a force to the aircraft cabin panel pre-assembly, deforming the deformable outer panel layer, and forming an aircraft cabin panel assembly comprising an aircraft cabin panel assembly exterior surface, with the aircraft panel assembly exterior surface comprising an area of exterior surface raised relief, with the area of exterior surface raised relief substantially matching the insert dimensional characteristic.

In another aspect, the method further includes applying an adhesive layer on at least one of the panel insert first side and the panel insert second side prior to disposing the panel insert between the panel substrate exterior side and the deformable outer panel layer interior side to form the aircraft cabin panel pre-assembly.

In another aspect, a method further includes applying an adhesive layer to at least one of the panel substrate exterior side and the deformable outer panel layer interior side prior to disposing the panel insert between the panel substrate exterior side and the deformable outer panel layer interior side to form the aircraft cabin panel pre-assembly.

In another aspect, at least one of the panel substrate exterior side, the panel insert, and the deformable outer panel layer interior includes a panel insert positioning element, with the panel insert positioning element configured to maintain the panel insert in a selected position between the panel substrate exterior side and the deformable outer panel layer interior side prior to applying the force to the aircraft cabin panel pre-assembly to form the aircraft cabin panel assembly.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
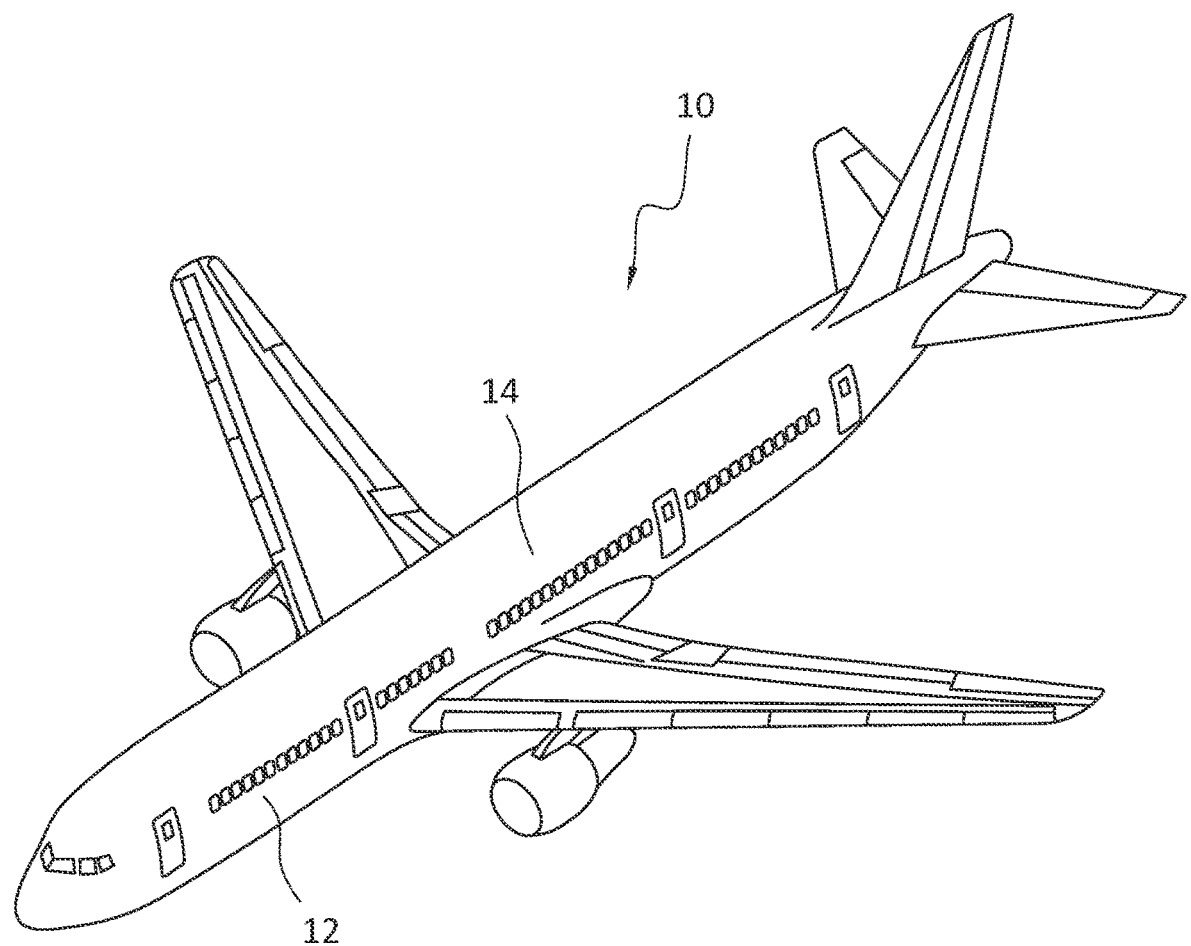
Figure 1B:
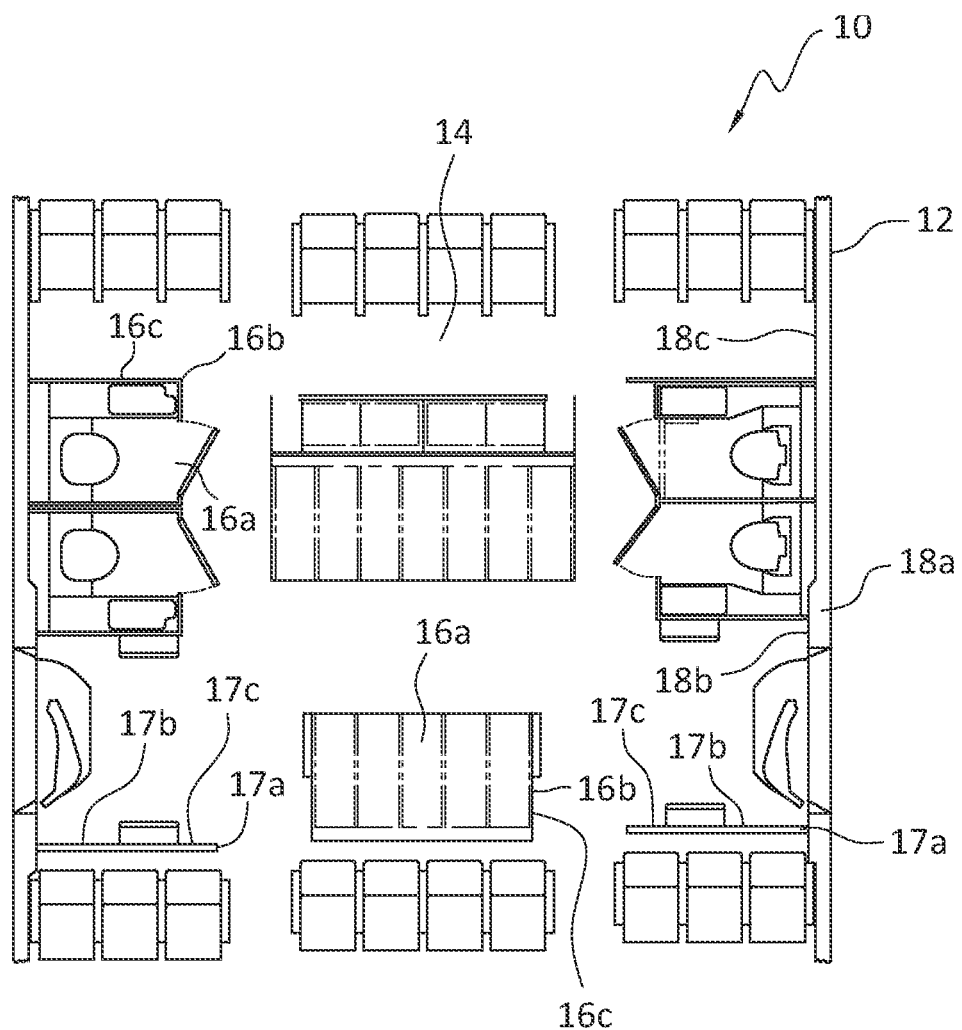
Figure 2:
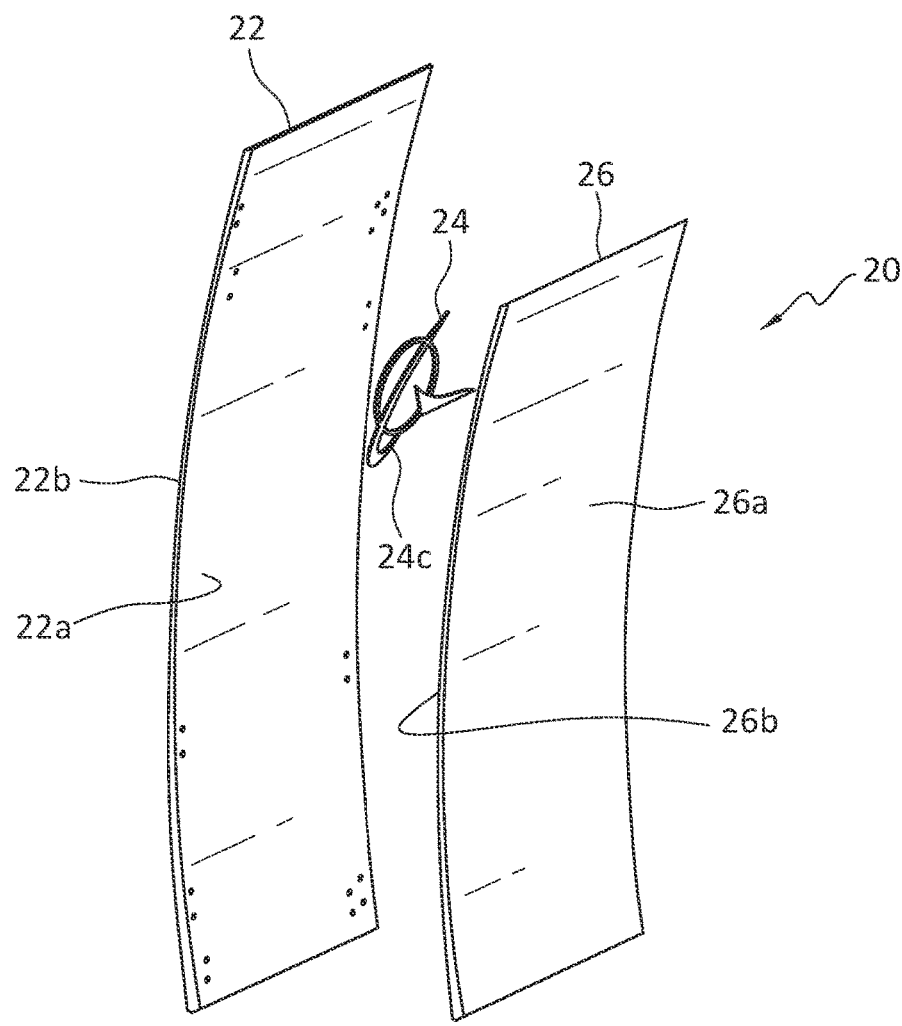
Figure 3:
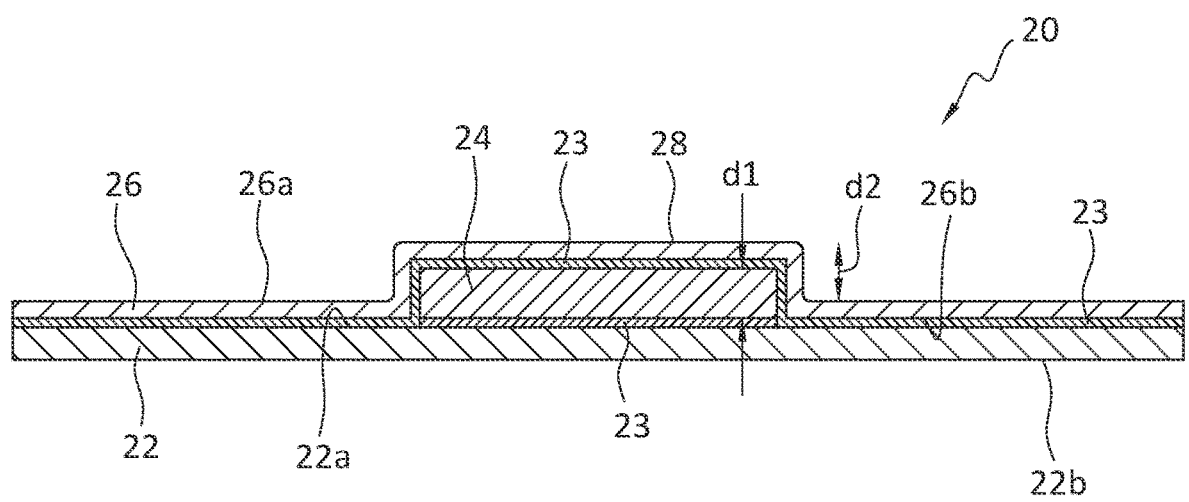
Figure 4A:
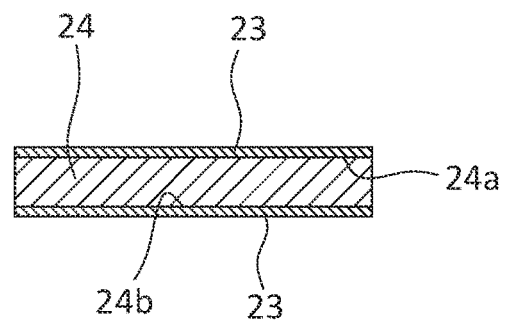
Figure 4B:
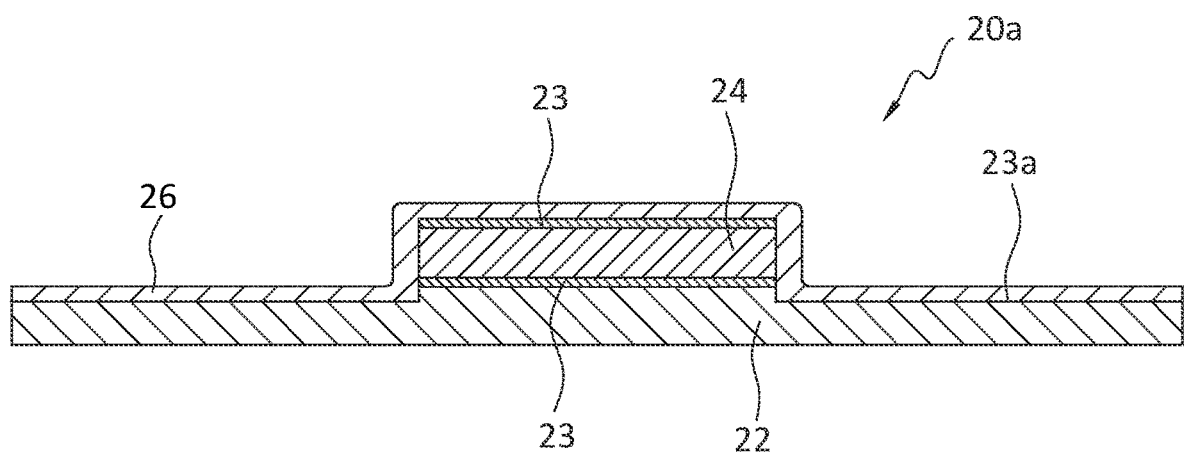
Figure 5:
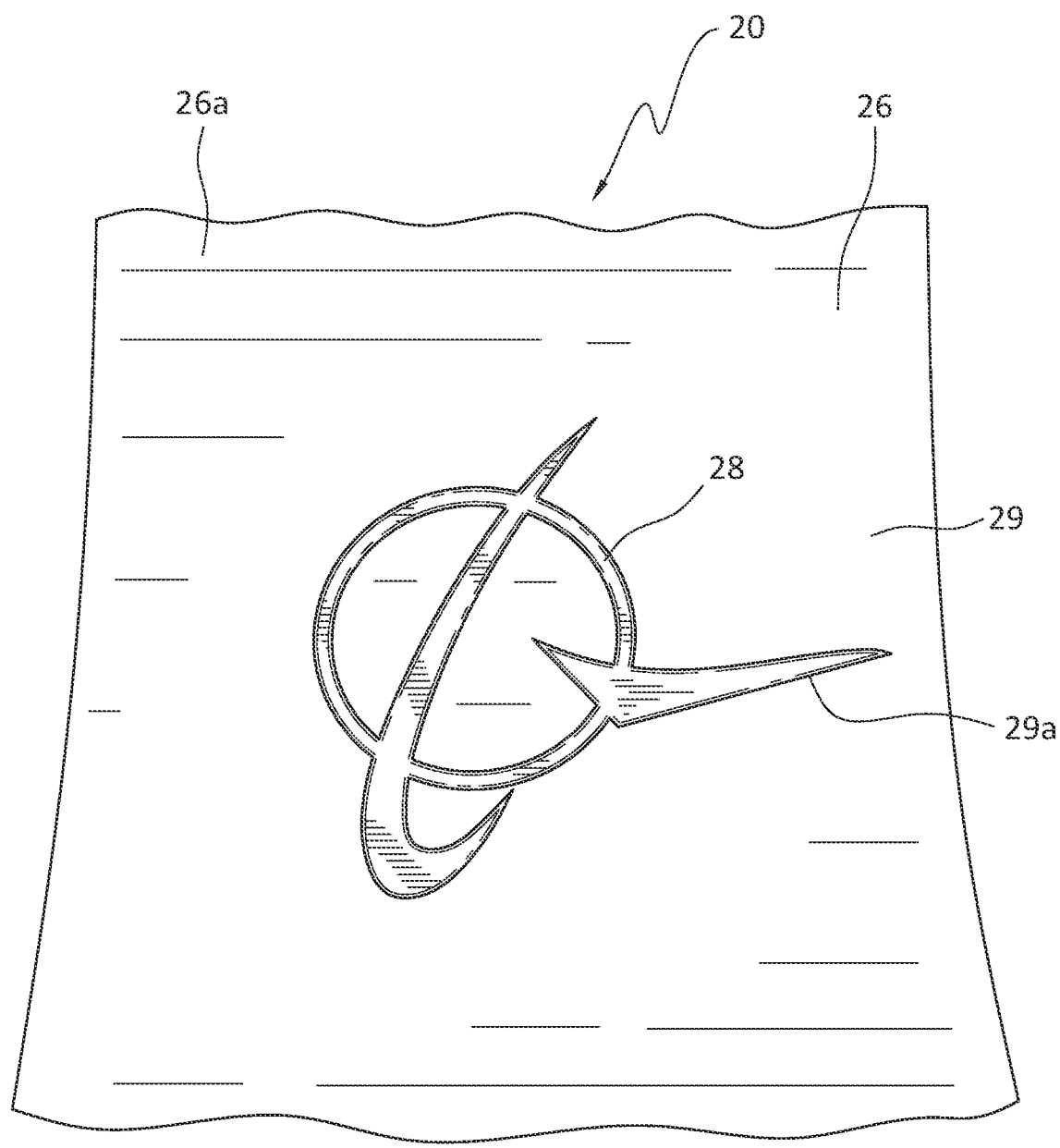
Figure 6:
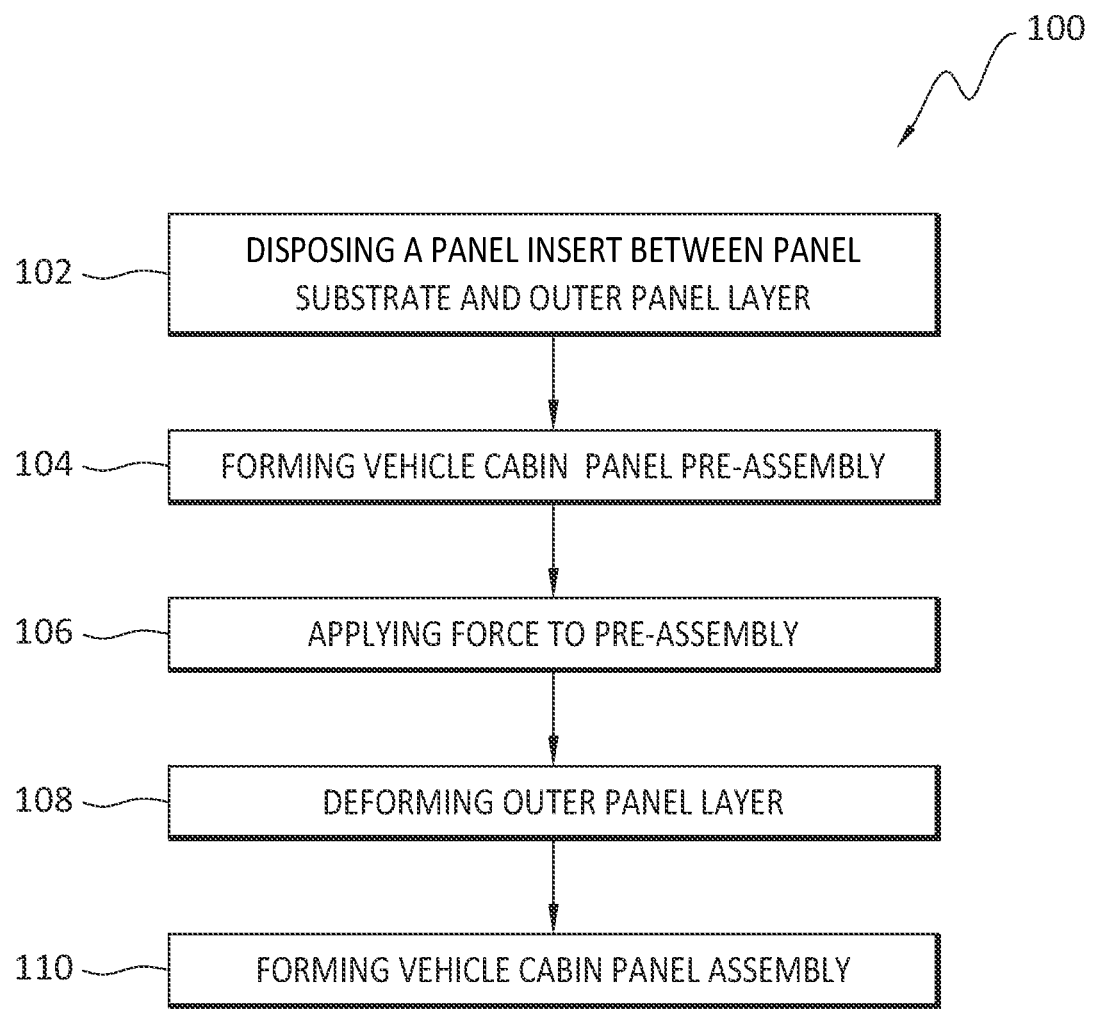
Figure 7:
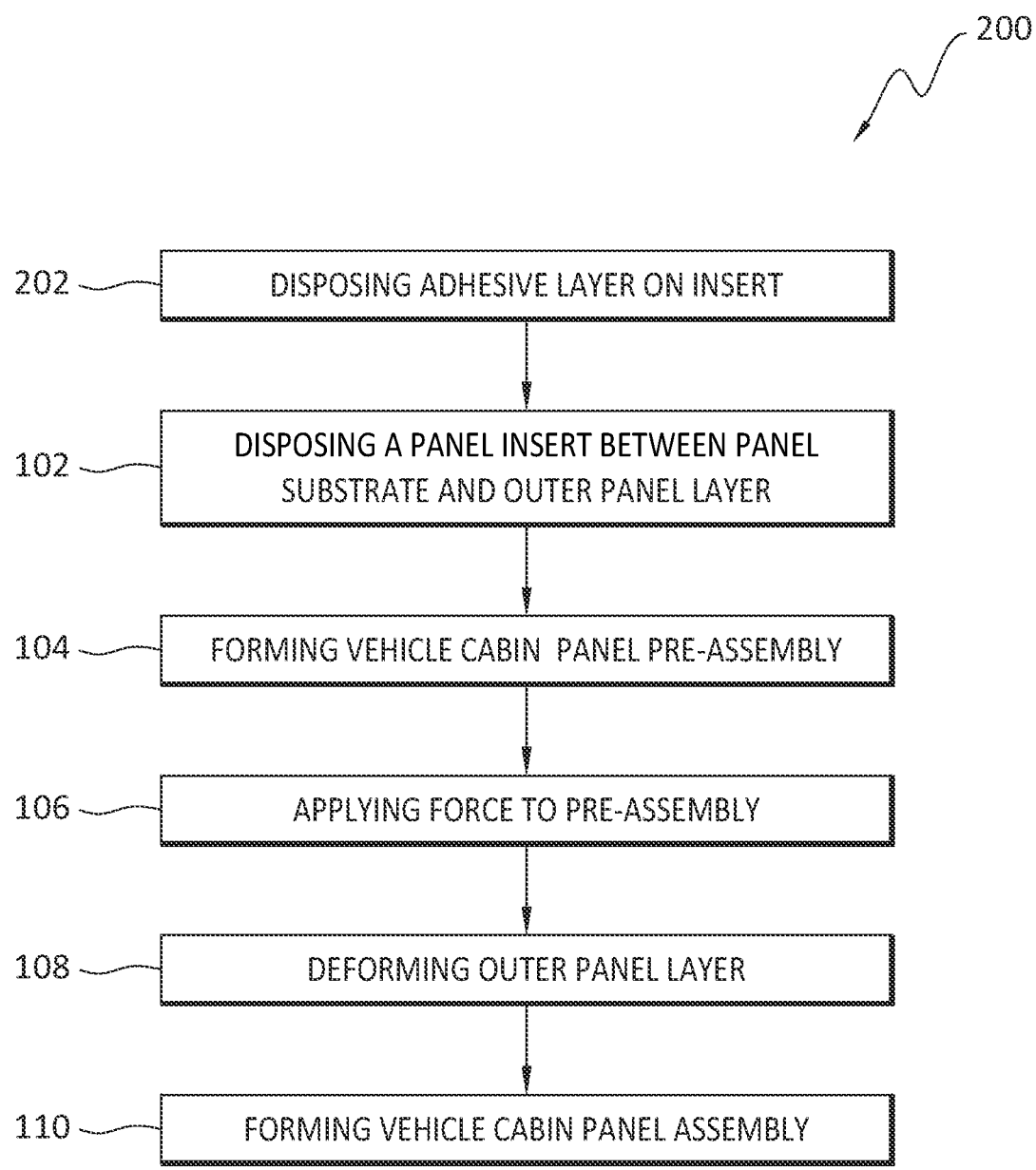
Figure 8:
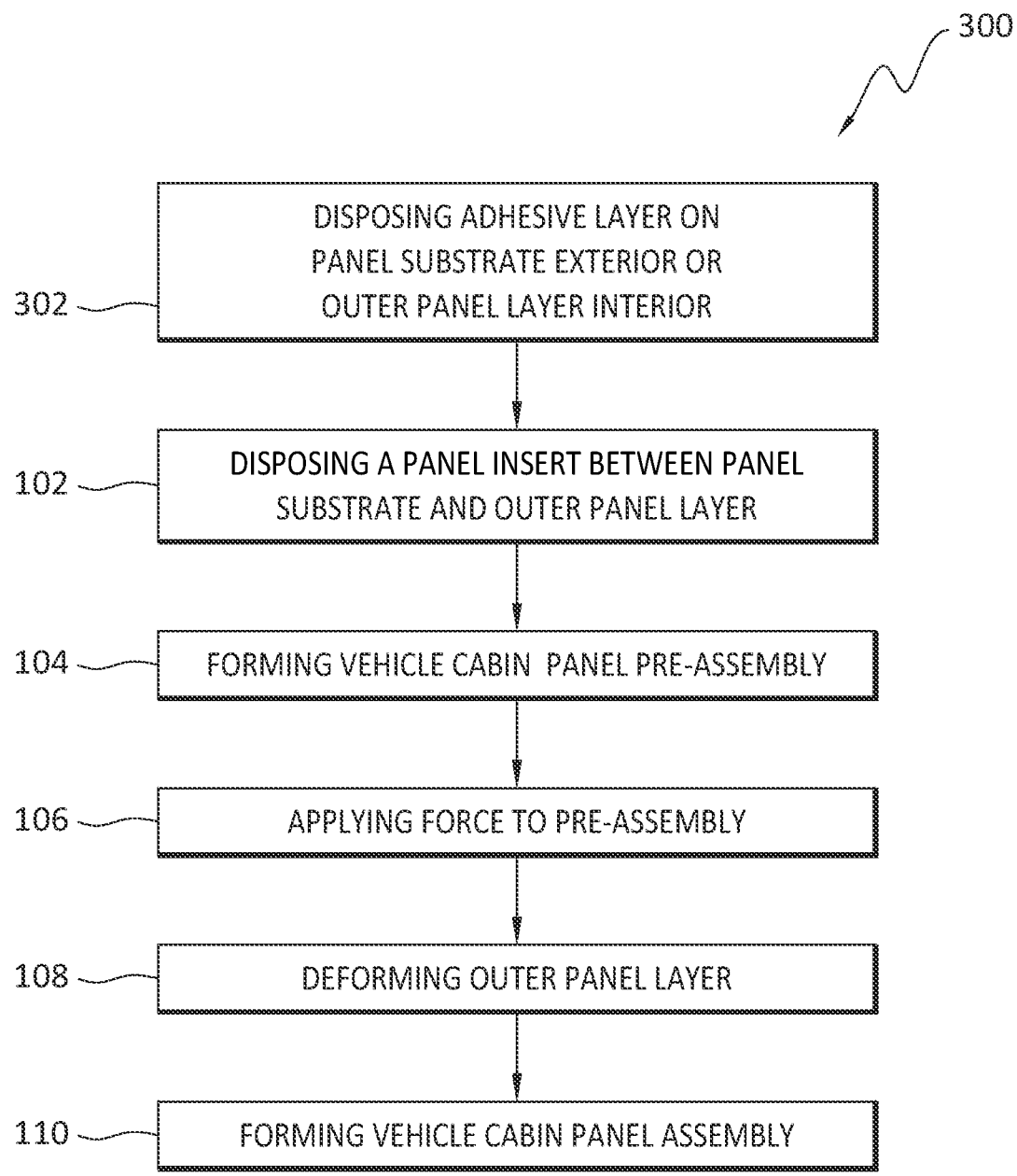

Having thus described variations of the disclosure in general terms, reference will now be made to the accompanying drawings, which are not necessarily drawn to scale, and wherein:

FIG. 1A is a perspective illustration of vehicle in the form of an aircraft, according to present aspects;

FIG. 1B is an exposed overhead view of a vehicle in the form of an aircraft that can be of the type shown in FIG. 1A, and further showing an aircraft cabin, according to present aspects;

FIG. 2 is an exploded view of an aircraft cabin panel, according to present aspects;

FIG. 3 is a cross-sectional side view of a vehicle cabin panel in the form of an aircraft cabin panel according to present aspects;

FIG. 4A is a cross-sectional side view of the panel insert, according to present aspects;

FIG. 4B is a cross-sectional side view of a vehicle cabin panel in the form of an aircraft cabin panel, according to present aspects;

FIG. 5 is a partial front view of a vehicle cabin panel in the form of an aircraft cabin panel, according to present aspects;

FIG. 6 is a flowchart outlining a method, according to present aspects;

FIG. 7 is a flowchart outlining a method, according to present aspects;

FIG. 8 is a flowchart outlining a method, according to present aspects; and

Figure 9:
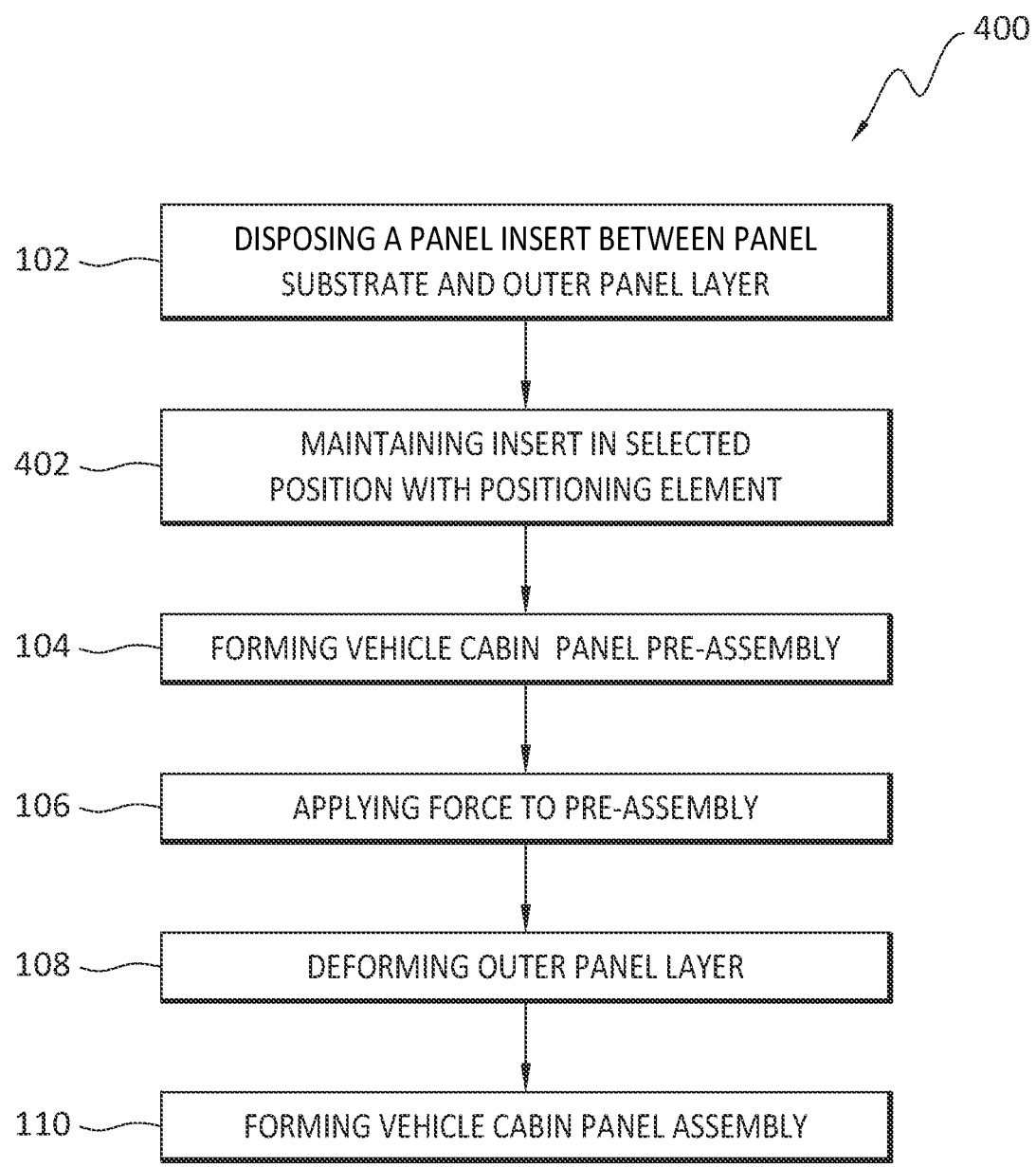

FIG. 9 is a flowchart outlining a method, according to present aspects.

DETAILED DESCRIPTION

According to present aspects, vehicle cabin panels that can be aircraft cabin panels can be, for example, customized without needing to maintain a vast and changing inventory of aircraft panel types having a desired outer appearance. That is, according to present aspects, aircraft cabin and aircraft cabin panel surface customization can be accomplished through the insertion of a selected panel insert that then becomes "visible" through the selected panel construction (e.g., panel assembly) that can use a standardized outer decorative lamination (e.g., "declam") material, but with the finished or final appearance of the panel assembly surface acquiring a selected customization of visual appearance (e.g., a customization that is visually detectable) that does not require the use and expense of, for example, complicated molds, individual surface machining, etc. or other manufacturing devices and/or processes that would be expensive and time-consuming to make, or conduct, etc.

FIG. 1A shows a perspective view of a vehicle in the form of an aircraft 10 comprising a fuselage 12 and an interior aircraft cabin 14. FIG. 1B is a cross-sectional overhead view of aircraft 10, showing an exposed view of the inside of aircraft 10, including aircraft cabin 14. FIG. 1B shows an aircraft cabin 14 comprising monuments 16a (that can be in the form of lavatories, galleys, etc.), partitions 17a, and aircraft cabin inboard walls 18a. Regarding the monuments 16a, FIG. 1B shows monuments 16a comprising monument walls 16b, with monument walls 16b comprising a monument wall panel 16c that further comprises a monument wall panel surface (e.g., an "interior" monument wall panel surface that faces into the aircraft cabin 14). Regarding the partitions 17a, FIG. 1B shows partitions 17a comprising partition walls 17b, with partition walls 17b comprising a partition wall panel 17c that further comprises a monument wall panel surface (e.g., an "interior" partition wall panel surface that faces into the aircraft cabin 14). In addition, regarding the inboard cabin walls 18a, FIG. 1B shows inboard cabin walls 18a comprising inboard cabin wall panel 18b that further comprises an inboard cabin wall panel surface 18c (e.g., an "interior" cabin wall panel surface that faces into the aircraft cabin 14).

FIG. 2 shows an exploded view of an aircraft cabin panel 20 (referred to equivalently herein as "aircraft cabin panel assembly 20", "vehicle cabin panel 20", and "vehicle cabin panel assembly 20), according to present aspects. Aircraft cabin panel 20 can be a wall panel located within an aircraft cabin that can be of the type of any of, for example, a monument wall panel 16c, a partition wall panel 17c and/or an inboard cabin wall panel 18b (as shown in FIG. 1B, for example). As shown in FIG. 2, aircraft cabin panel 20 comprises a panel substrate 22 comprising a panel substrate first side 22a and a panel substrate second side 22b. Aircraft cabin panel 20 further comprises a deformable outer panel layer 26 that further comprises a deformable outer panel layer first side 26a and deformable outer panel layer second side 26b. FIG. 2 further shows aircraft cabin panel 20 comprising a panel insert 24 interposed between panel substrate first side 22a and deformable outer panel layer second side 26b. Panel insert 24 comprises a panel insert first side 24a and a panel insert second side 24b. When the panel insert 24 is interposed between panel substrate 22 and deformable outer panel layer 26 the panel insert first side 24a will be positioned and otherwise rest adjacent deformable outer panel layer second side 26b, and the panel insert second side 24b will be positioned and otherwise rest adjacent panel substrate first side 22a. As shown in FIG. 2, the components of the aircraft cabin panel 20 can be combined to form a "pre-assembly" that will become the aircraft cabin panel 20 (referred to equivalently as an aircraft cabin panel assembly 20) after a selected force is applied to compress the "pre-assembly" panel components together to alter a dimension of the deformable outer panel layer first side, according to present aspects, and as further described herein.

FIG. 3 is a cross-sectional side view of the assembled aircraft cabin panel 20 showing the components of the aircraft cabin panel 20 in an assembled state, with the components being the assembled components shown in FIG. 2; namely: the panel substrate 22, the deformable outer panel layer 26, and the interposed panel insert 24. Additionally, as shown in FIG. 3, an insert positioning layer 23 (that be, for example, a tackifier layer having a selected degree of "tack" or an adhesive layer\, with the tackifier layer and the adhesive layer referred to equivalently herein as the insert positioning layer) can be interposed between the panel substrate 22 and the deformable outer panel layer 26.

The deformable outer panel layer, as described herein, can be a thin decorative laminate material (e.g., a "declam" layer) that can be a thermoplastic material such as polyvinyl fluoride material of the type sold commercially, and known as TEDLAR® (DuPont), for example. The deformable outer panel layer is typically a thin material having, for example, an average thickness ranging from about 3 mils to about 5 mils. The specific average thickness of the present deformable outer panel layer is not limiting, so long as the deformable outer panel layer selected can deform significantly to allow the deformable layer to "deform" and allow the dimension of the interposed panel insert (that can be substantially non-compressible) to push into and alter dimensional surface characteristics of the deformable outer panel layer first surface (the "outer surface") to such an extent as to be visually and texturally detectable (e.g., detectable to sight and to touch).

According to present aspects, the "non-compressibility" (otherwise equivalently referred to herein as a component's "rigidity") of the panel insert (otherwise equivalently referred to herein as the panel insert "rigidity") is a characteristic that is relative to the compressibility/rigidity characteristic of the deformable outer panel layer. In other words, the deformable outer panel layer can be deformed, expanded, compressed, etc., (e.g., is compressible/non-rigid to the point of being deformable, etc.) at a selected pressure that will not substantially deform or substantially compress the panel insert. Additionally, at least the panel substrate first side (e.g. the panel substrate side facing and otherwise in contact with the panel insert) of the panel substrate is also non-compressible at least to a similar degree of non-compressibility as the panel insert. In this way, according to present aspects, when a force (e.g., pressure) is applied to the panel pre-assembly to form the panel assembly, only the deformable outer panel layer will "deform" outwardly from the panel to form an area of raised relief that substantially reproduces or otherwise mimic the dimensional characteristic (e.g., shape, design, logo, scene, indicia, etc.) of the panel insert (e.g., the panel insert dimensional characteristic 24c).

As shown in FIG. 3 the insert positioning layer 23 "surrounds" the panel insert 24. In one example, the insert positioning layer 23 can be incorporated into or added as a separate layer to at least one of the panel substrate first side 22a and the deformable outer panel layer second side 26b. In another example, the insert positioning layer 23 can be incorporated into or added to at least one of the panel insert first side 24a and the panel insert second side 24b. In one example, the insert positioning layer 23 can be any material that assists with the alignment of the panel insert in the panel assembly process (e.g., the positioning of the panel insert in the panel pre-assembly). In another example, the insert positioning layer 23 can be any material that assists with the retention of the panel insert in a selected location in the panel assembly process (e.g., the positioning of the panel insert in the panel pre-assembly) relative to the panel substrate and the deformable outer panel layer.

The insert positioning layer can be an adhesive material including, for example, a pressure sensitive adhesive material, or an adhesive material that is activated by pressure or heat (e.g., a heat-sensitive adhesive material, etc.). The insert positioning layer can also be a tackifier that has a selected "tack" and that will act as an alignment aid for the panel insert and that will otherwise retain the panel insert in a selected position on at least one of the panel substrate second first side and the deformable outer panel layer second side, for example.

The panel insert can be made from a material that does not significantly deform under a selected pressure used to assemble the present panel construction and convert the panel "pre-assembly" into the finished aircraft cabin panel assembly 20. In one example, the panel insert is a metal foil. In another the panel insert is a plastic material. Again, the panel insert selected is intended to be made from a "firm", substantially non-deformable material, that at least will not deform before the structural alteration (e.g., the "deformation" of the deformable outer panel layer).

FIG. 3 shows panel insert 24 having an average thickness "d1" that can remain substantially constant during transformation of the panel from panel pre-assembly through panel assembly. FIG. 3 further shows an area of the deformable outer panel layer 26 that is adjacent to the panel insert, with the adjacent area of the deformable outer panel layer having an area of deformation resulting in a raised relief area. In one present example, the raised relief area of the deformable outer panel area has a height, "d2", that is substantially equivalent to the panel insert thickness, "d1". That is, according to present aspects the dimensional characteristic of the panel insert 24 is "transferred" to the panel assembly exterior surface as the dimensional characteristics of the insert are compressed into and otherwise outwardly deform the deformable outer panel layer to "replicate" the dimensional characteristics of the panel insert and produce a visually detectable image in raised relief in the deformable outer panel layer.

FIG. 4A is a cross-sectional and enlarged side view of panel insert 24 having panel insert first side 24a and panel insert second side 24*b*. According to a present example, the panel insert 24 can comprise insert positioning layer 23 on at least one of the panel insert first side 24*a* and panel insert second side 24*b*. In one example, during pre-assembly of panel 20, the panel insert 24 (with the insert positioning layer applied to panel insert first side 24*a*) can be applied to, or otherwise positioned against the deformable outer panel layer second side 26*b*. To complete the panel assembly in this example, the panel substrate 22 is brought into contact with the deformable outer panel layer 26 comprising the panel insert 24 positioned on the deformable outer panel layer second side 26*b*, and with the panel insert interposed therebetween.

In another example, during pre-assembly of panel 20, the panel insert 24 with the insert positioning layer 23 applied to panel insert second side 26*b* can be applied to, or otherwise positioned against the panel substrate first side 22*a*. To complete the panel assembly in this example, the deformable outer panel layer 26 is brought into contact with the panel substrate comprising the panel insert positioned on the panel substrate first side 22*a*, and with the panel insert interposed therebetween.

FIG. 4B is a cross-sectional and enlarged side view of an assembled aircraft cabin panel 20*a* (referred to equivalently herein as "aircraft cabin panel assembly 20*a*") that is similar to the aircraft cabin panel 20 shown in FIGS. 2 and 3. As shown in FIG. 4B, the insert positioning layer 23 has been applied to surfaces of the panel insert 24 as described herein with respect to FIG. 4A. Accordingly, the insert positioning layer does not completely surround panel insert 24 (as shown in FIG. 3., for example). As further shown in FIG. 4B, an insert positioning layer 23 can be positioned between the panel substrate and the deformable outer panel layer 26, for example during pre-assembly of aircraft panel 20*a*. In this example, an adhesive layer 23*a* can comprise an adhesive material that is the same as or different than an adhesive that is selected for use as the insert positioning layer 23, as described herein.

As assembled, panel 20 can have a selected amount of pressure applied during assembly such that deformable outer panel layer is "deformed" about the panel insert such that the dimensional characteristic of the panel insert is presented in raised relief at the surface (e.g., "outer" surface that faces into aircraft cabin 14. The amount of pressure applied to achieve the desired raised relief at the surface of the panel 20 will depend on the thickness of the panel insert, the thickness of the deformable outer panel layer, and other factors, etc. Assembled panel 20 can be incorporated into at least one of aircraft cabin monuments, partitions, inboard cabin walls and can function as an aircraft cabin monument wall panel, a partition wall panel, and an inboard cabin wall panel, with the raised relief "indicia" being visually detectable and further being detectable to the touch.

FIG. 5 is a partial view of the front of aircraft cabin panel 20 having deformable outer panel layer 26 (with deformable panel outer layer first side 26*a* ("outer" side facing into, for example, an aircraft cabin), with indicia shown in raised relief as a deformable outer panel layer dimensional characteristic 28 that is a substantial replica of the panel insert 24 dimensional characteristic. As explained herein, the "height" of the raised relief indicia (shown in FIG. 5 as a logo) that forms the deformable outer panel layer dimensional characteristic can be substantially equal to the thickness of the panel insert. As shown in FIG. 5, the deformable outer panel layer dimensional characteristic 28 appears as a logo, and can be an indicia, a design, a pattern, a scene, etc. and is visually detectable at the aircraft cabin panel exterior surface (equivalently referred to herein as the aircraft cabin panel assembly) 29, and wherein the dimensional characteristic 28 that is visually detectable appears at the aircraft cabin panel exterior surface raised area 29*a*. with the area of exterior surface appearing in raised relief substantially matching or at least closely approximating (e.g., appearing to "mimic") the panel insert dimensional characteristic. The raised relief area 29*a* is visually detectible, visually perceptible to the human eye, and tactilely detectable to human touch, with the dimensional characteristic of the panel insert occurring at the panel exterior surface in a configuration that is "out-of-plane" with the plane of majority of the plane of the panel exterior surface.

According to present aspects, the various aircraft cabin panel dimensions at least in terms of thickness, can vary among, for example, partition wall panels, inboard cabin wall panels, monument wall panels, ceiling panels, etc. For example, inboard sidewall panels can have an average thickness ranging, for example, from about 0.1 to about 0.125 inches. Ceiling panel average thicknesses can range, for example, from about 0.3 inch to about 0.5 inch. Partition wall average thicknesses can range, for example, from about 0.4 to about 0.5 inches.

The decorative laminate material used to form the present deformable outer panel layer can have an average thickness ranging from about 2 to about 4 mils. According to further present aspects, the presence of the panel insert within the panel assembly can impact the deformable outer panel layer to the extent that the image created in the outer surface of the deformable outer panel layer can be visually detected when the thickness of the panel insert ranges from about 2 to about 4 mils.

According to present aspects, panel assembly procedures and protocols call for an amount of joining pressure that is adequate to result in a visually detectable image to appear in the outer surface of the deformable outer panel layer when a panel insert is interposed between the panel substrate and the deformable outer panel surface. This result can be accomplished at a compressive pressure ranging from about 14 psi when the thicknesses of the panel insert and the deformable outer panel layer are approximately equivalent; for example, with each of the panel insert and the deformable outer panel layer having an average thickness ranging from about 2 mils to about 4 mils. When such pressure range is observed and the average thicknesses are observed, according to present aspects, the resulting altered deformable outer panel layer surface will not stretch or incur texture washout. In this way, according to present aspect, an indicia, logo, scene, design, etc., can be imprinted in raised relief, and be visually detectable to the human eye, without adversely impacting the overall outer texture and performance of the deformable outer panel layer (e.g., the decorative laminate or "declam" outer material layer).

According to present aspects, the thickness of the panel insert can vary along and across its area (e.g., the panel insert can have varying "heights" at varying regions of the insert, etc.), such that the raised relief pattern, indicia, logo, design, scene, etc., (collectively referred to herein as "raised relief pattern") imparted to the deformable outer panel layer outer surface will substantially "match" or "mimic" the height dimensions of the visually detectable raised relief pattern that is produced by the inclusion of the interposed panel insert.

FIGS. 6, 7, 8, and 9 are flowcharts outlining methods according to present aspects. FIG. 6 is a flowchart outlining a method for forming a raised relief area on an aircraft cabin panel assembly exterior surface, with the method 100 including disposing 102 a panel insert between a panel substrate first side (e.g., exterior) side and a deformable outer panel layer second (e.g., interior) side, forming 104 an aircraft vehicle cabin panel pre-assembly, with the vehicle cabin pre-assembly comprising an aircraft panel pre-assembly exterior surface, with the panel insert comprising a panel insert dimensional characteristic, and with the insert further comprising a panel insert first (e.g., exterior) side and a panel insert second (e.g., interior) side. The method 100 further includes applying 106 a force to the vehicle cabin panel pre-assembly, deforming 108 the deformable outer panel layer, and forming 110 a vehicle cabin panel assembly comprising a vehicle cabin panel assembly exterior surface, with the vehicle panel assembly exterior surface comprising an area of exterior surface raised relief, said area of exterior surface raised relief substantially matching the insert dimensional characteristic.

In another aspect, as shown in FIG. 7, a method 200 can include the aspects of method 100 and further includes disposing 202 an insert positioning layer that can be at least one of an adhesive layer and a tackifier layer on at least one of the panel insert first side and the panel insert second side prior to disposing 102 the panel insert between the panel substrate exterior side and the deformable outer panel layer interior side to form the vehicle cabin panel assembly. According to method 200, the adhesive layer can be In another aspect, as shown in FIG. 8, a method 300 can include the aspects of method 100 and further includes applying 302 an insert positioning layer that can be at least one of an adhesive layer and a tackifier layer to at least one of the panel substrate first (e.g. exterior) side and the deformable outer panel layer second (e.g., interior) side prior to disposing 102 the panel insert between the panel substrate exterior side and the deformable outer panel layer interior side to form the vehicle cabin panel pre-assembly.

In another aspect, as shown in FIG. 9, at least one of the panel substrate exterior, the panel insert, and the deformable outer panel layer interior can include a panel insert positioning element, with a method 400, as shown in FIG. 9 comprising the aspects of method 100 and further including maintaining 402 the panel insert in position via the panel positioning element that can be a physical element, or that can be an insert positioning layer as disclosed herein, with the panel positioning element configured to maintain the panel insert in a selected position between the panel substrate exterior side and the deformable outer panel layer interior side prior to applying the force to the vehicle cabin panel pre-assembly.

The present methods shown and FIGS. 6, 7, 8, and 9 can include the present panel pre-assemblies, panel assemblies, and components of the panel pre-assemblies and component of the panel assemblies disclosed herein and shown in at least one of FIGS. 1, 2, 3, 4A, 4B, and 5. The aircraft shown in FIG. 1 and the aircraft cabin shown in FIG. 2 can further comprise the present panel pre-assemblies, panel assemblies, and components of the panel pre-assemblies and component of the panel assemblies disclosed herein and shown in at least one of FIGS. 3, 4A, 4B, and 5.

While the present panels, panel pre-assemblies, panel assemblies have application within an aircraft cabin and aircraft comprising an aircraft cabin, the present panels, panel pre-assemblies, panel assemblies can be incorporated into vehicle cabins and vehicle cabin walls that can include vehicle cabins and vehicle cabin walls in vehicles including, for example, crewed aircraft, uncrewed aircraft, crewed terrestrial vehicles, uncrewed terrestrial vehicles, crewed marine vehicles, uncrewed marine vehicles, and combinations thereof.

While the present panels, panel pre-assemblies, panel assemblies have application within an aircraft cabin and aircraft comprising an aircraft cabin, the present panels, panel pre-assemblies, panel assemblies can be incorporated into stationary structures and stationary structure walls including buildings, etc.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An aircraft cabin panel comprising:
   a panel substrate, said panel substrate comprising a panel substrate first side and a panel substrate second side;
   a panel insert, said panel insert comprising a panel insert first side and a panel insert second side, said panel insert second side positioned adjacent the panel substrate first side, said panel insert further comprising a panel insert dimensional characteristic, said panel insert comprising a panel insert thickness ranging from about 2 mils to about 4 mils;
   a deformable outer panel layer, said deformable outer panel layer comprising a deformable outer panel layer first side and a deformable outer panel layer second side, said deformable outer panel layer further comprising a deformable outer panel layer average thickness, said deformable outer panel layer first side further comprising a raised relief area, said raised relief area substantially matching the panel insert dimensional characteristic said deformable outer panel layer comprising a deformable outer panel layer thickness ranging from about 2 mils to about 4 mils;
   an insert positioning layer consisting of at least one of an adhesive layer and a tackifier layer, said insert positioning layer configured to maintain the panel insert in a selected position between the panel substrate first side and the deformable outer panel layer second side during assembly of the aircraft cabin panel;
   wherein the deformable outer panel layer dimensional characteristic is visually detectable and tactilely detectable at an aircraft cabin panel exterior surface;
   wherein the panel insert thickness is substantially equivalent to the deformable outer panel layer thickness; and
   wherein the dimensional characteristic in the panel insert and transfer of the dimensional characteristic from the panel insert to the deformable outer panel layer does not require individual machining.

2. The aircraft cabin panel of claim 1, wherein the deformable outer panel layer first side is the aircraft cabin panel exterior surface.

3. The aircraft cabin panel of claim 2, wherein the aircraft cabin panel exterior surface comprises an aircraft cabin panel exterior surface raised area, and wherein said raised relief area is out-of-plane with respect to the aircraft cabin panel exterior surface.

4. The aircraft cabin panel of claim 1, wherein the raised relief area is visually detectable and tactilely detectable.

5. The aircraft cabin panel of claim 1, wherein the panel substrate comprises a sandwich panel construction.

6. The aircraft cabin panel of claim 1, wherein the deformable outer panel layer comprises a decorative laminate material.

7. The aircraft cabin panel of claim 1, further comprising an adhesive layer, said adhesive layer positioned between the panel substrate first side and the deformable outer panel layer second side.

8. The aircraft cabin panel of claim 1, wherein the panel insert further comprises an adhesive layer on at least one of the panel insert first side and the panel insert second side.

9. An aircraft cabin comprising the aircraft cabin panel of claim 1.

10. An aircraft comprising the aircraft cabin panel of claim 1.

11. A method for forming a raised relief area on an aircraft cabin panel assembly exterior surface, the method comprising:

disposing a panel insert between a panel substrate exterior side of a deformable outer panel layer and a deformable outer panel layer interior side of the deformable outer panel layer to form an aircraft cabin panel pre-assembly, said panel insert comprising a panel insert dimensional characteristic, said panel insert further comprising a panel insert first side and a panel insert second side, said panel insert comprising a panel insert thickness ranging from about 2 mils to about 4 mils, said deformable outer panel layer comprising a deformable outer panel layer thickness ranging from about 2 mils to about 4 mils, said panel insert thickness substantially equivalent to the deformable outer panel layer thickness;

forming the aircraft cabin panel pre-assembly, said aircraft cabin panel pre-assembly comprising an aircraft cabin panel pre-assembly exterior surface;

applying a force of about 14 psi to the aircraft cabin panel pre-assembly;

deforming the deformable outer panel layer; and forming an aircraft cabin panel assembly comprising the aircraft cabin panel assembly exterior surface, said aircraft panel assembly exterior surface comprising an area of exterior surface raised relief, said area of exterior surface raised relief substantially matching the panel insert dimensional characteristic; and wherein the dimensional characteristic in the panel insert and transfer of the dimensional characteristic from the panel insert to the deformable outer panel layer does not require individual machining.

12. The method of claim 11, further comprising:

applying an adhesive layer on at least one of the panel insert first side and the panel insert second side prior to disposing the panel insert between the panel substrate exterior side and the deformable outer panel layer interior side to form the aircraft cabin panel pre-assembly.

13. The method of claim 11, further comprising:

applying an adhesive layer to at least one of the panel substrate exterior side and the deformable outer panel layer interior side prior to disposing the panel insert between the panel substrate exterior side and the deformable outer panel layer interior side to form the aircraft cabin panel pre-assembly.

14. The method of claim 11, wherein the aircraft panel assembly exterior surface comprising the area of exterior surface raised relief is visually detectable and is further tactilely detectable.

* * * * *